United States Patent [19]

Matthews

[11] 4,032,618

[45] June 28, 1977

[54] CONVERSION OF AMMONIA INTO HYDROGEN AND NITROGEN BY REACTION WITH A SULFIDED CATALYST

[75] Inventor: Charles W. Matthews, Denver, Colo.

[73] Assignee: The United States Energy Research and Development Administration, Washington, D.C.

[22] Filed: May 11, 1976

[21] Appl. No.: 685,484

[52] U.S. Cl. .............................. 423/351; 423/238; 423/648 R
[51] Int. Cl.² .................... C01B 21/00; C01B 1/00; C01B 4/00; C01B 6/00
[58] Field of Search .......... 423/237, 238, 351, 648

[56] References Cited

UNITED STATES PATENTS

| | | | |
|---|---|---|---|
| 3,540,189 | 11/1970 | Siewers et al. | 423/237 |
| 3,773,912 | 11/1973 | Spangler | 423/237 |
| 3,798,308 | 3/1974 | Tatterson | 423/237 |
| 3,819,816 | 6/1974 | Wunderlich et al. | 423/238 |
| 3,915,655 | 10/1975 | Grulich et al. | 423/237 |
| 3,970,743 | 7/1976 | Beavon | 423/237 |

*Primary Examiner*—O. R. Vertiz
*Assistant Examiner*—Eugene T. Wheelock
*Attorney, Agent, or Firm*—Dean E. Carlson; Frank H. Jackson; Hugh W. Glenn

[57] ABSTRACT

A method is provided for removing ammonia from the sour water stream of a coal gasification process. The basic steps comprise stripping the ammonia from the sour water; heating the stripped ammonia to a temperature from between 400° to 1,000° F; passing the gaseous ammonia through a reactor containing a sulfided catalyst to produce elemental hydrogen and nitrogen; and scrubbing the reaction product to obtain an ammonia-free gas. The residual equilibrium ammonia produced by the reactor is recycled into the stripper. The ammonia-free gas may be advantageously treated in a Claus process to recover elemental sulfur. Iron sulfide or cobalt molybdenum sulfide catalysts are used.

1 Claim, 1 Drawing Figure

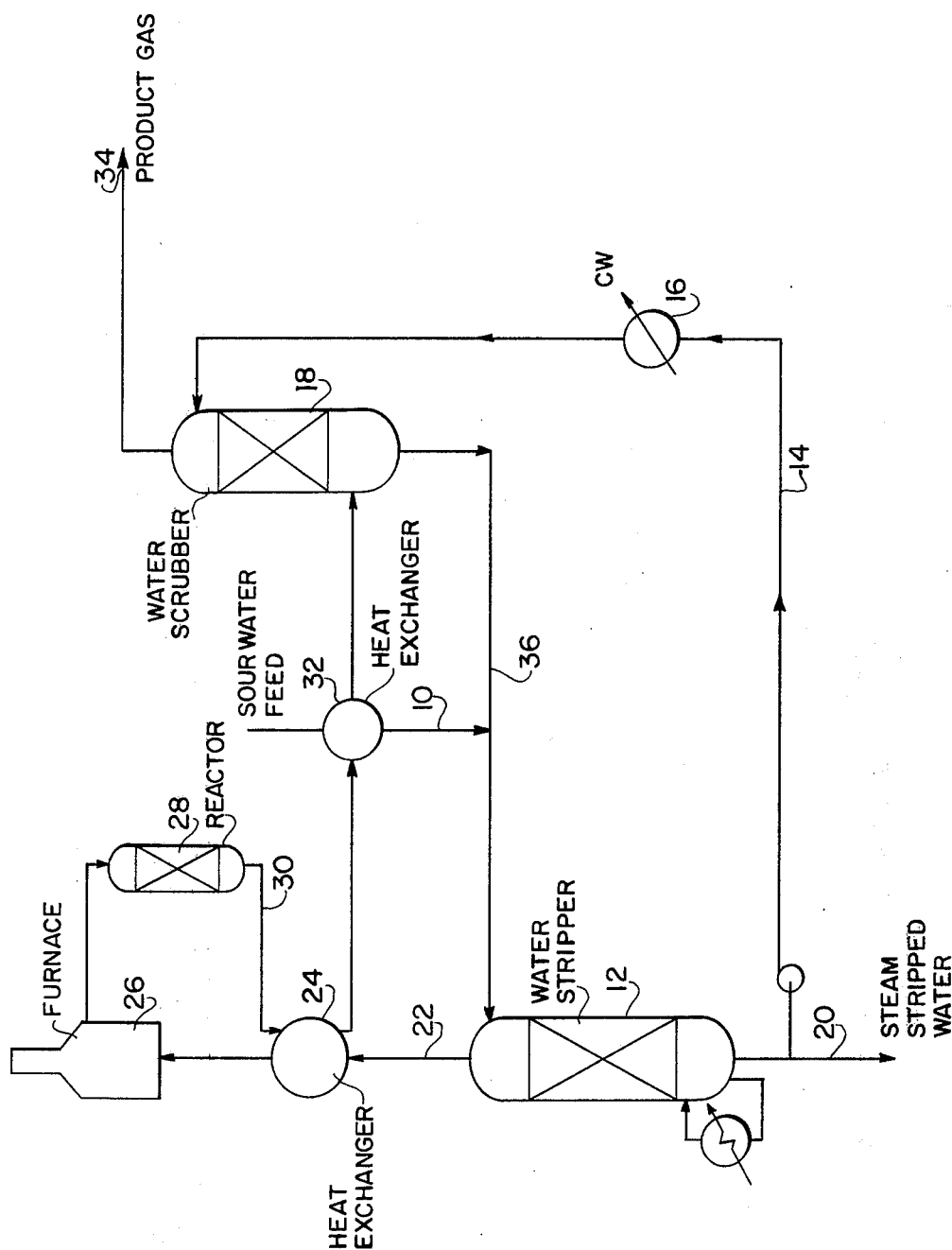

CONVERSION OF AMMONIA INTO HYDROGEN AND NITROGEN BY REACTION WITH A SULFIDED CATALYST

FIELD OF THE INVENTION

The present invention relates to the conversion of ammonia contained in sour water, such as that obtained from a coal gasification process, to its elements of hydrogen and nitrogen.

BACKGROUND OF THE INVENTION

The recent unprecedented increases in the prices of oil and natural gas has prompted new efforts in developing commercially feasible coal gasification processes, in order to effectively utilize available coal reserves. A severe obstacle encountered in bringing coal gasification to a widely utilized commercial reality is the disposal, in an environmentally acceptable manner, of the sour water produced by the gasification process. This air and water pollution problem associated with the coal gasification process will, in the future, take on added significance as stricter environmental legislation becomes effective.

Coke oven gases, gases from coal gasification and gases from shale oil processing contain contaminating amounts of ammonia, hydrogen cyanide, carbonyl sulfide, carbon dioxide, and hydrogen sulfide. In order to remove these contaminants, the gases are often scrubbed with water, and then steam-stripped to separate the dissolved gases from the water which is subsequently reused or discarded. It is advantageous, for both environmental and commercial reasons, to produce elemental sulfur through use of the Claus process. However, the high ammonia content of the gas in question may cause severe plugging of the catalyst beds employed in the Claus process. Therefore, the ammonia content of the gas stream must be significantly reduced prior to the stream being fed to the Claus plant.

A traditional method of disposing of the water-washed ammonia-containing gas stream has been simply to discharge the stream into the municipal sewer system. This water frequently contains appreciable amounts of hydrogen sulfide, which is a serious pollutant and a toxic gas. In light of recent legislation and public concern, the discharge of ammonia and sulfur rich aqueous solution into municipal sewer systems has become an unacceptable, if not illegal, method of disposing of the gasification process waste effluent.

A second method involves the steam stripping of the sour water and the subsequent incineration of the stripped gases to convert the hydrogen sulfide in the stripped gas to sulfur dioxide for release to the atmosphere. Processes of this type are usually not economically feasible when performed in conjunction with coal gasification, since they require the heating of the stripped gas to very high temperatures, e.g. on the order of approximately 2200° F. Therefore, this method is usually only suitable in coke-oven plants where a high temperature heat source is readily available (see U.S. Pat. Nos. 3,540,189, 3,822,337 and 3,661,507).

Methods have also been proposed for scrubbing the stripped gases in order to produce a saleable product. One such method involves the scrubbing of the stripped gases with sulfuric acid for the production of ammonia sulfate. Another process, the so-called "Phosam" process, effects ammonia removal by scrubbing the stripped gases with an aqueous ammonium phosphate solution and produces anhydrous ammonia. Both of these processes suffer from high capital cost requirements and the inability to generate sufficient revenues to recover operating costs.

The prior art also contains numerous proposals for disposing of ammonia streams that are not the result of coal gasification. For instance, U.S. Pat. No. 3,467,491 discloses an apparatus for combusting pure ammonia streams by use of air over a platinum catalyst to produce water and nitrogen. U.S. Pat. No. 3,804,596 teaches the combustion of a pure ammonia vapor stream in a refrigeration unit. Neither apparatus is suitable for use in a coal gasification process, because, inter alia, of the contaminants contained in the ammonia-rich stripped gas stream. Also, the use of an oxidation catalyst, such as copper oxide, has been used for ammonia removal from the effluent of a combustion potassium-carbonate acid removal process (see, e.g., U.S. Pat. No. 3,412,736). Again, apart from any other considerations, this process is not suitable when sulfur compounds are present in an ammonia stream, since the oxidation catalyst would be poisoned by the sulfur.

SUMMARY OF THE INVENTION

In accordance with the present invention, a method of disposing the ammonia by-product from a coal gasification process is provided which overcomes the disadvantages of the prior art processes discussed above. According to the invention, sour water effluent from a coal gasification process is stripped with steam and passed over a sulfided catalyst at a temperature in the range of 400° to 1,000° F, so as to convert the ammonia to nitrogen and hydrogen. Advantageously, the residual ammonia, dictated by equilibrium, in the resultant gas may be recycled to the stripper and the ammonia-free gas may then be treated using the Claus process to obtain elemental sulfur. The products from the reactor are preferably used to pre-heat the vapor obtained from the stripper. Provision is also preferably made for the transfer of the stripped water to the scrubber for ammonia absorption and for the cooling of the reactor products by heat exchange with the sour water stream.

The process of the present invention provides significant advantages in the areas of reduced capital and operating costs and represents a relatively inexpensive and effective alternative to the discharge of harmful pollutants to the atmosphere and municipal water sources.

Other features and advantages of the invention will be set forth in, or apparent from, the detailed description of a preferred embodiment found hereinbelow.

BRIEF DESCRIPTION OF THE DRAWINGS

The single FIGURE in the drawings is a schematic diagram illustrating a system for carrying out the process in accordance with the invention.

DESCRIPTION OF THE PREFERRED EMBODIMENTS

The basic operating principles of the treating of a sour water effluent derived from a coal gasification process of the invention will be described relative to the system illustrated in the drawings. Coke oven gases, gases from oil gasification and gases from shale oil processing which have been scrubbed with water to form a sour water containing contaminating amounts of ammonia, hydrogen cyanide, carbonyl sulfide, carbon dioxide and hydrogen sulfide enter the ammonia removal process through a stream indicated at 10. The gas-rich water is passed to a stripper 12 where it is steam stripped to separate the dissolved gases from the water. The stripped water is passed through a line 14 including a cooling heat exchanger 16 to a water scrubber 18. The excess water is discarded through an exhaust line 20.

The gas stream emerging from the stripper 12 consists primarily of acid gases and water vapor enriched with ammonia, containing small amounts of carbonyl sulfide and hydrogen cyanide. This gas, which is transferred by an outlet line 22, is heated to the reaction temperature of from 400° to 1,000° F, and preferably 700° to 1,000° F, in a heat exchanger 24 and a furnace or fired heater 26, before being passed to a reactor 28. Most of the required heat is supplied by heat exchanger 24 although supplemental heat, as supplied by furnace 26 or another suitable heat source, is usually necessary. The gas passing through the heat exchanger 24 is preheated therein using the heat from effluent from reactor 28 as provided by a connecting line 30.

The heated gas is passed over a sulfided catalyst in reactor 28. The sulfided catalyst is preferably iron sulfide or cobalt molybdenum sulfide. The conversion of ammonia into nitrogen and hydrogen occurs in accordance with the following reaction:

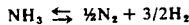

$$NH_3 \rightleftarrows \tfrac{1}{2}N_2 + 3/2 H_2$$

The pressure in the reactor should preferably be atmospheric, although pressures as high as 1000 psi may be suitable. It has also been found that as the temperature approaches 1000° F, the equilibrium shifts toward the right, whereas increased pressure adversely affects the ammonia conversion. Further, it should be noted that the ammonia is not totally converted in a single pass through the catalyst bed, but approaches equilibrium at the reaction temperature and pressure conditions.

The reactor 28 can be a conventional down-flow reactor or can be a radial-flow reactor, when minimum pressure losses are required. The catalyst must be essentially unaffected by the hot acid gases or water vapor. Such catalysts are those commercially used for the shift conversion reactions and those which promote hydrogenation and dehydrogenation reactions. These catalysts are most often supplied in the form of tablets, pellets, spheres, or extrudates. Not only in nitrogen and hydrogen obtained from the ammonia in reactors 28, but the following other principal reactions also take place therein:

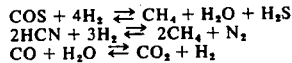

$$COS + 4H_2 \rightleftarrows CH_4 + H_2O + H_2S$$
$$2HCN + 3H_2 \rightleftarrows 2CH_4 + N_2$$
$$CO + H_2O \rightleftarrows CO_2 + H_2$$

The reactor effluent after passing through heat exchanger 24 is cooled in a further exchanger 32 by exchange with the sour water from the primary process, viz., the sour water in line 10. The reactor effluent is then fed into scrubber 18 where it is washed with clean stripped water to provide absorption of the small amounts of equilibrium ammonia therein. The ammonia-free gas exits from the overhead of scrubber 18 through an outlet line 34. Water from the scrubber is returned through a connecting line 36 to the stripping column 12 for recovery of the ammonia. The ammonia is then recycled through the heating steps to the reactor 28 for its conversion into nitrogen and hydrogen.

In the above process, all of the ammonia is eventually converted to nitrogen and hydrogen. The ammonia-free gas in line 34 which is released from the scrubber 18 is suitable for treatment in a Claus process in order to obtain elemental sulfur.

As should be evident from the foregoing, the process of the invention produces an acid gas-rich stream, which is ammonia-free and which is an acceptable feed for the conventional Claus plant. Moreover, the ammonia from the sour water is converted to its elements of nitrogen and hydrogen with minimal capital investment and at minimal operating cost.

Although the invention has been described relative to a preferred embodiment thereof, it will be understood by those skilled in the art the variations and modifications can be effected in this embodiment without departing from the scope and spirit of the invention.

I claim:

1. In a process for the removal of $NH_3$ and other contaminants including HCN, COS, $CO_2$ and $H_2S$ from a coal gasification process wherein said contaminants are contained in water as a liquid waste stream, and wherein said waste stream is stripped with steam to provide a gas stream containing said contaminants and a stripped water stream, the improvement comprising
    heating said gas stream containing said contaminants to a temperature of about 700° to 1000° F.;
    passing said heated gas stream into contact with a catalyst of cobalt molybdenum sulfide to convert a portion of the $NH_3$ contained therein to $N_2$ and $H_2$;
    passing said heated gas stream in heat exchange relationship first with said gas stream to initiate said heating step and then with said liquid waste stream to cool said heated gas and to heat said liquid waste prior to its introduction into the steam stripping step;
    scrubbing said gas stream with a first part of said stripped water stream to remove the unconverted portion of said $NH_3$ therefrom into a scrub water stream;
    combining said scrub water stream containing the unconverted $NH_3$ with said liquid waste stream and steam stripping said combined stream to provide said gas stream containing contaminants and said stripped water stream; and
    discharging a second part of said stripped water stream and the scrubbed gas including said other contaminants from said process.

* * * * *